(12) United States Patent
Segawa et al.

(10) Patent No.: US 7,864,450 B2
(45) Date of Patent: Jan. 4, 2011

(54) MICROLENS ARRAY SHEET AND METHOD OF PRODUCING THE SAME

(75) Inventors: Masaru Segawa, Yokohama (JP); Masahiko Sugiyama, Yokohama (JP); Yoichiro Nakatani, Mito (JP)

(73) Assignee: Victor Company of Japan, Ltd., Kanagawa-Ken (JP)

( * ) Notice: Subject to any disclaimer, the term of this patent is extended or adjusted under 35 U.S.C. 154(b) by 61 days.

(21) Appl. No.: 12/378,962

(22) Filed: Feb. 23, 2009

(65) Prior Publication Data
US 2009/0159195 A1 Jun. 25, 2009

Related U.S. Application Data

(62) Division of application No. 11/316,638, filed on Dec. 21, 2005, now Pat. No. 7,515,357.

(30) Foreign Application Priority Data

Dec. 27, 2004 (JP) ............................... 2004-376014
May 27, 2005 (JP) ............................... 2005-155135

(51) Int. Cl.
*G02B 9/08* (2006.01)
(52) U.S. Cl. ...................................................... 359/740

(58) Field of Classification Search ................. 359/738, 359/740; 264/1.37, 1.7
See application file for complete search history.

(56) References Cited

U.S. PATENT DOCUMENTS 6,594,079 B1 * 7/2003 Trott et al. ................... 359/456

* cited by examiner

*Primary Examiner*—Joseph Martinez
(74) *Attorney, Agent, or Firm*—Renner, Kenner, Greive, Bobak, Taylor & Weber

(57) ABSTRACT

A microlens array sheet includes a light-shielding base having a first surface and a second surface opposite to the first surface and a microlens array attached to the first surface of the light-shielding base, the array having a plurality of microlens. The light-shielding base has a plurality of apertures that correspond to the microlenses. Each aperture has a conical trapezoid-like shape in which a size of each aperture on the first surface side is larger than another size of each aperture on the second surface side. Instead of the light-shielding base, the microlens array sheet may include a transparent base having a first surface and a second surface opposite to the first surface and a light-shielding layer, having a third surface and a fourth surface opposite to the third surface, provided on the second surface of the transparent base. The microlens array is attached to the first surface of the transparent base. The light-shielding layer has a plurality of apertures that correspond to the microlenses. Each aperture has a conical trapezoid-like shape in which a size of each aperture on the third surface side is larger than another size of each aperture on the fourth surface side.

3 Claims, 18 Drawing Sheets

| PROCESSING REQUIREMENTS | LIGHT-SHIELDING LAYER THICKNESS (μm) | SELF-ALIGNED OPENING SECTIONAL SHAPE | LIGHT TRANSMISSION FACTOR (%) | EVALUATION OF TRANSMISSIVITY | EVALUATION OF CONTRAST | EVALUATION OF LASER PROCESSABILITY | TOTAL EVALUATION |
|---|---|---|---|---|---|---|---|
| (A) | 50 | NORMAL CONICAL TRAPEZOID | 22.7 | NO GOOD | NO GOOD | GOOD | NO GOOD |
| (B) | 50 | NORMAL CONICAL TRAPEZOID | 65.3 | NO GOOD | FAIR | GOOD | NO GOOD |
| (C) | 50 | CIRCULAR CYLINDER | 80.4 | FAIR | GOOD | GOOD | FAIR |
| (D) | 50 | REVERSE CONICAL TRAPEZOID | 91.1 | EXCELLENT | EXCELLENT | GOOD | GOOD |

FIG. 10

| LIGHT-SHIELDING LAYER THICKNESS (μm) | SELF-ALIGNED OPENING SECTIONAL SHAPE | LIGHT TRANSMISSION FACTOR (%) | EVALUATION OF TRANSMISSIVITY | EVALUATION OF CONTRAST | EVALUATION OF LASER PROCESSABILITY | TOTAL EVALUATION |
|---|---|---|---|---|---|---|
| 1 | REVERE CONICAL TRAPEZOID | 92.3 | EXCELLENT | FAIR | EXCELLENT | FAIR |
| 2 | REVERE CONICAL TRAPEZOID | 91.9 | EXCELLENT | GOOD | EXCELLENT | GOOD |
| 5 | REVERE CONICAL TRAPEZOID | 91.6 | EXCELLENT | GOOD | EXCELLENT | GOOD |
| 10 | REVERE CONICAL TRAPEZOID | 91.5 | EXCELLENT | EXCELLENT | EXCELLENT | EXCELLENT |
| 20 | REVERE CONICAL TRAPEZOID | 91.4 | EXCELLENT | EXCELLENT | GOOD | GOOD |
| 50 | REVERE CONICAL TRAPEZOID | 91.1 | EXCELLENT | EXCELLENT | GOOD | GOOD |
| 75 | REVERE CONICAL TRAPEZOID | 90.8 | GOOD | EXCELLENT | FAIR | FAIR |
| 100 | REVERE CONICAL TRAPEZOID | 90.3 | GOOD | EXCELLENT | NO GOOD | NO GOOD |

FIG. 11

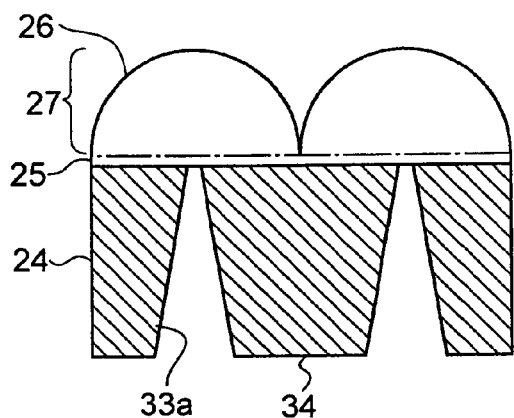
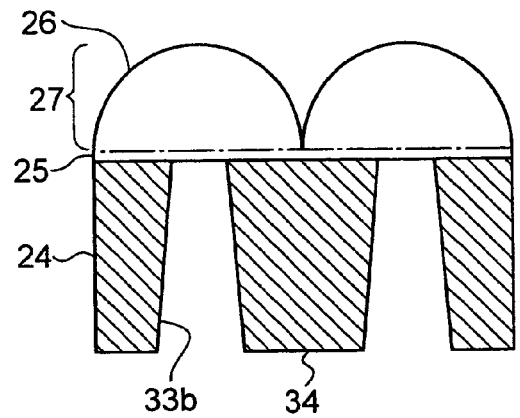
FIG. 17A        FIG. 17B
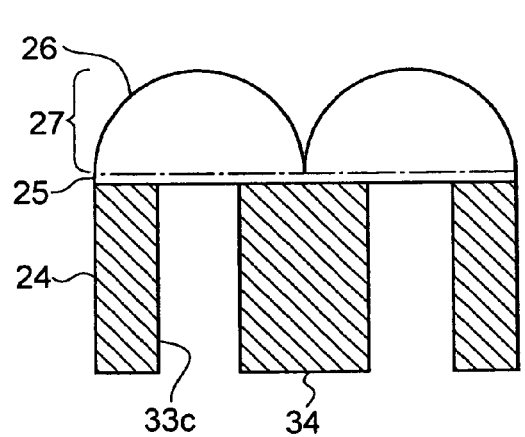
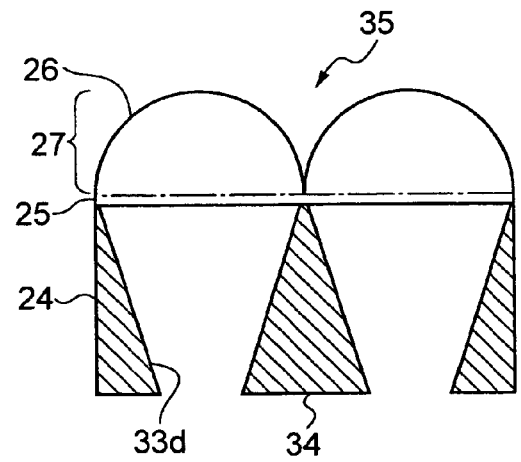
FIG. 17C        FIG. 17D

| PROCESSING REQUIREMENTS | LIGHT-SHIELDING LAYER THICKNESS (μm) | SELF-ALIGNED OPENING SECTIONAL SHAPE | LIGHT TRANSMISSION FACTOR (%) | EVALUATION OF TRANSMISSIVITY | EVALUATION OF CONTRAST | EVALUATION OF LASER PROCESSABILITY | TOTAL EVALUATION |
|---|---|---|---|---|---|---|---|
| (E) | 45 | NORMAL CONICAL TRAPEZOID | 17.2 | NO GOOD | NO GOOD | GOOD | NO GOOD |
| (F) | 45 | NORMAL CONICAL TRAPEZOID | 54.4 | NO GOOD | FAIR | GOOD | FAIR |
| (G) | 45 | CIRCULAR CYLINDER | 75.8 | FAIR | GOOD | GOOD | GOOD |
| (H) | 45 | REVERSE CONICAL TRAPEZOID | 90.5 | EXCELLENT | EXCELLENT | GOOD | EXCELLENT |

FIG. 18

MICROLENS ARRAY SHEET AND METHOD OF PRODUCING THE SAME

CROSS-REFERENCE TO RELATED APPLICATIONS

This application is based on and claims the benefit of priority from the prior Japanese Patent Application No. 2004-376014 filed on Dec. 27, 2004 and No. 2005-155135 filed on May 27, 2005, the entire contents of which are incorporated herein by reference.

This application is a division of U.S. patent application Ser. No. 11/316,638 filed Dec. 21, 2005.

BACKGROUND OF THE INVENTION

The present invention relates to a microlens array sheet having a plurality of semispheroid microlenses cut from a spheroid material or semispherical microlenses cut from a spherical material, and a method of producing such a microlens array sheet. Particularly, this invention relates to a microlens array sheet useful for screens, for example, in rear-projection televisions, and a method of producing such a microlens array sheet.

Displays are classified into a direct-view type for direct-viewing images displayed on a cell assembly and a projection type for viewing images projected onto a screen by front or rear projection. The latter can be manufactured in a large type at low cost and are gradually popular, especially, in North America and China.

A rear-projection display is a projection type. This type of display mostly employs a lenticular lens array sheet for its screen. The lenticular lens array sheet is, usually, produced by extrusion or injection molding, or press roll with a photocurable resin.

However, the lenticular lens array sheet has a problem in that it gives a wider angle of field only either a horizontal or vertical direction.

In order to solve such a problem, Japanese Un-examined Patent Publication No. 2001-305315 proposes a screen equipped with a light-shielding layer having a microlens array sheet with a lens function.

The microlens array sheet has microlens aligned on a flat base, as concave and convex sections of the base. A screen equipped with such a microlens array sheet is applicable to displays and expected to be popular in the near future.

Japanese Un-examined Patent Publication No. 2001-305315 discloses a microlens array sheet. Formed on a surface of a lens substrate is a plurality of microlenses. Formed on the other surface of the substrate is a light-shielding layer having a circular or square light-emitting section.

The Un-examined Patent Publication gives one requirement ($Sr \geq 2t \times \tan \Theta + R$) to the microlens array sheet, in which "Sr" is the size of the microlens, "t" is the thickness of the lens substrate, "$\Theta$", equal to $\sin^{-1}(1/n)$, is the maximum incident angle, "n" is a refractive index of the lens substrate, and "R" is the diameter of the light-emitting section.

However, a microlens array sheet designed according to the expression shown above sometimes causes optical vignetting, a phenomenon in which transmissivity (the amount of an outgoing beam/the amount of an incoming beam) is decreased when a part of an incoming beam incident along a correct optical path is blocked due to spherical aberration. This is because the above expression does not include a focal point of each microlens.

According to the expression, the maximum incident angle "$\Theta$" depends the refractive index "n" of the lens substrate. Thus, an outgoing beam emitted from the light-emitting section originated from an incoming beam having the maximum incident angle "$\Theta$" sometimes causes optical vignetting to other incoming beams.

Wider apertures for the light-shielding layer to avoid optical vignetting decreases a ratio of the area of black on the light-shielding layer to the total area of a light diffusion plate, thus causing lower contrast for projected images.

There is thus a demand for a microlens array sheet and a production method thereof that achieve both restriction of optical vignetting and enhancement of contrast inconsistent with each other.

SUMMARY OF THE INVENTION

A purpose of the present invention is to provide a high-performance microlens array sheet that exhibits high light transmissivity to offer high contrast images and a method of producing such a microlens array sheet.

The present invention provides a microlens array sheet comprising: a light-shielding base having a first surface and a second surface opposite to the first surface; and a microlens array attached to the first surface of the light-shielding base, the array having a plurality of microlenses, wherein the light-shielding base has a plurality of apertures that correspond to the microlenses, each aperture having a conical trapezoid-like shape in which a size of each aperture on the first surface side is larger than another size of each aperture on the second surface side.

Moreover, the present invention provides a microlens array sheet comprising: a transparent base having a first surface and a second surface opposite to the first surface; a microlens array attached to the first surface of the transparent base, the array having a plurality of microlenses, a light-shielding layer, having a third surface and a fourth surface opposite to the third surface, provided on the second surface of the transparent base, the light-shielding layer having a plurality of apertures that correspond to the microlenses, each aperture having a conical trapezoid-like shape in which a size of each aperture on the third surface side is larger than another size of each aperture on the fourth surface side.

Furthermore, the present invention provides a method of producing a microlens array sheet comprising the steps of: preparing a light-shielding base having a first surface and a second surface opposite to the first surface; attaching a microlens array having a plurality of microlenses on the first surface of the light-shielding base so that a focal point of each microlens is located in the vicinity of the second surface of the light-shielding base, thus producing a microlens array base structure; and emitting a laser beam to the microlens array base structure so that the beam is focused onto the focal point of each microlens in a direction orthogonal to the light-shielding base, thus removing a part of the light-shielding base to form an aperture that correspond to each microlens, the aperture having a conical trapezoid-like shape in which a size of the aperture on the first surface side is larger than another size of the aperture on the second surface side.

Still, furthermore, the present invention provides a method of producing a microlens array sheet comprising the steps of: preparing a transparent base having a first surface and a second surface opposite to the first surface; attaching a microlens array having a plurality of microlenses on the first surface of the transparent base; forming a light-shielding layer, having a third surface and a fourth surface opposite to the third surface, on the second surface of the transparent base so that the third surface faces the second surface; arranging the microlens so that a focal point of each microlens is located in the vicinity of the fourth surface of the light-shielding layer, thus producing a microlens array base structure; and emitting a laser beam to the microlens array base structure so that the beam is focused onto the focal point of each microlens in a direction orthogonal to the light-shielding layer, thus removing a part of the light-shielding layer to form an aperture that correspond to each microlens, the aperture having a conical trapezoid-like shape in which a size of the aperture on the third surface side is larger than another size of the aperture on the fourth surface side.

BRIEF DESCRIPTION OF DRAWINGS

FIG. 10 is a table listing the light transmission factor (in a visible-light range under consideration of relative visibility), the contrast of projected images, and the laser processability versus the sectional shape of self-aligned apertures in the first preferred embodiment;

FIG. 11 is a table listing the light transmission factor (in a visible-light range under consideration of relative visibility), the contrast of projected images, and the laser processability versus the thickness of a light-shielding layer in the first preferred embodiment;

FIGS. 17A to 17D are schematic sectional views for several self-aligned apertures having different sectional shapes depending on laser-processing requirements in the second preferred embodiment;

FIG. 18 is a table listing the light transmission factor (in a visible-light range under consideration of relative visibility), the contrast of projected images, and the laser processability versus the sectional shape of self-aligned apertures in the second preferred embodiment;

DETAILED DESCRIPTION OF PREFERRED EMBODIMENTS

Preferred embodiments of a microlens sheet and a production method for such a microlens sheet according to the present invention will be disclosed with reference to the attached drawings.

The same reference signs or numerals are given to the same or analogous elements throughout figures. The figures are not drawn in scale and exaggerated particularly in the thickness direction for easier understanding.

First Embodiment

A microlens sheet which is produced by a first embodiment of a production method disclosed below is equipped with a microlens array and a light-shielding layer provided on both sides of a transparent base.

The production method, as the first embodiment, includes formation of a microlens array on a transparent base (a first process), formation of a light-shielding layer on the transparent base (a second process), and self-alignment formation of apertures to the light-shielding layer (a third process).

(First Process)

Figure 1:
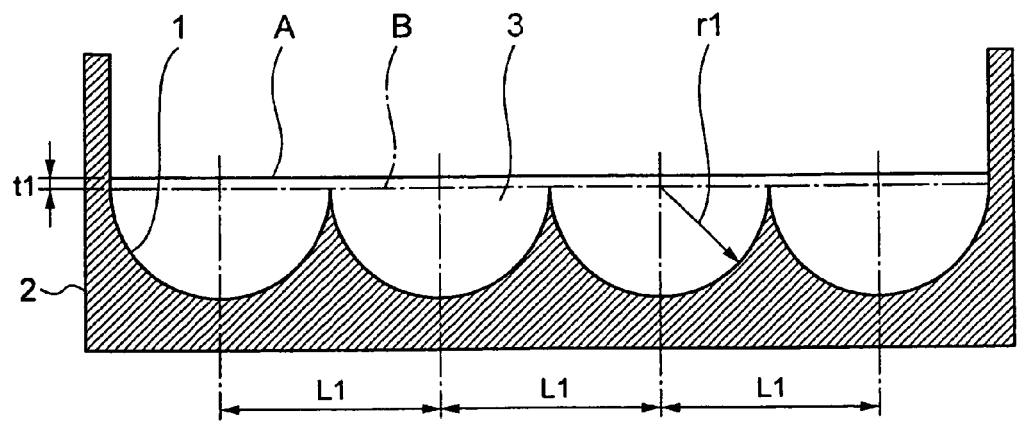
FIG. 1 is a schematic sectional view illustrating a first process in a first preferred embodiment of a method of producing a microlens array sheet according to the present invention.
Figure 2:
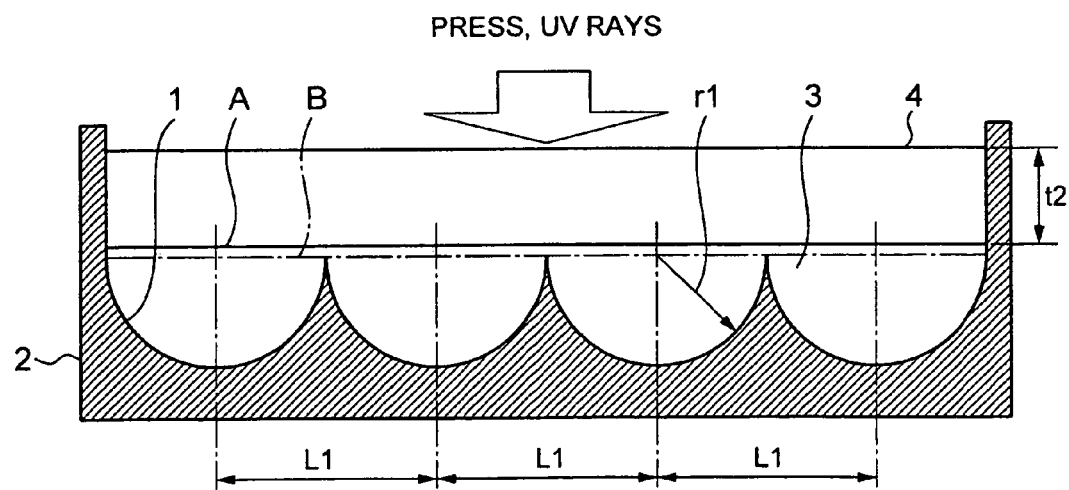
FIG. 2 is a schematic sectional view illustrating the first process in the first preferred embodiment of a method of producing a microlens array sheet according to the present invention.
Figure 3:
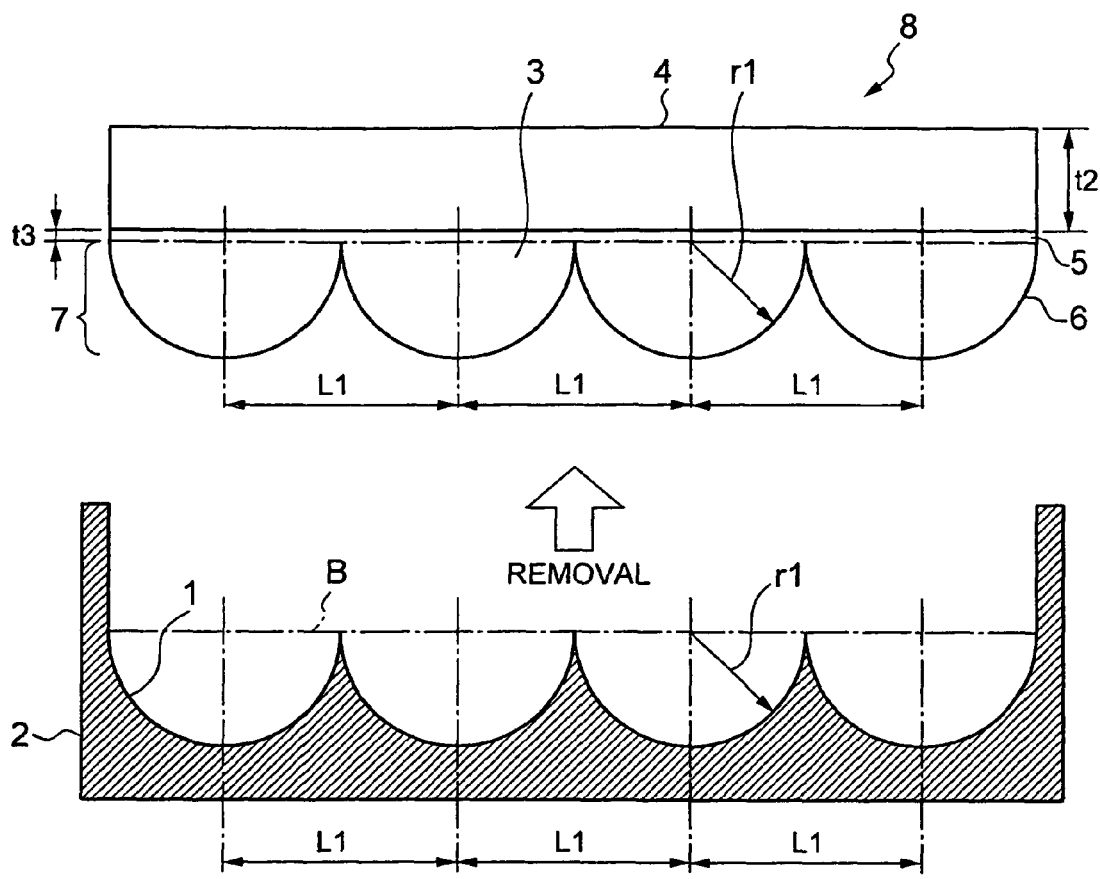
FIG. 3 is a schematic sectional view illustrating the first process in the first preferred embodiment of a method of producing a microlens array sheet according to the present invention.

The first process (formation of a microlens array on a transparent base) will be disclosed with reference to FIGS. 1 to 3.

Prepared first is a metal mold 2 having a plurality of concave and semisphere-like shape sections 1 each with 50 μm in radius "r1", aligned at a pitch "L1" of 100 μm, by closest packing or injection, as shown in FIG. 1. The metal mold 2 is used for production of a microlens array, which will be disclosed later.

Injected into the semisphere-like shape sections 1 is a UV (ultraviolet)-curable resin 3 that exhibits about 180 mPa·s in viscosity and 90% or higher in light transmissivity when cured. Employed as the resin 3 in this embodiment is TB3087B made by Three Bond. Co., Ltd.

The amount of the UV-curable resin 3 to be injected is adjusted so that the level "A" of the resin 3 is higher, by a height "t1", than the level "B" of the opening of each semisphere-like shape section 1 of the metal mold 2. Although disclosed layer, the thickness of a transparent layer which is formed in the later stage is adjusted with the height "t1" of the resin 3 and also pressure in radiation of UV rays.

Although, the metal mold 2 has more semisphere-like shape sections 1 in actual application, it is shown in FIG. 1 as having just four sections 1 for simple illustration of its shape in cross section. This is also true for the other drawings.

Next, as shown in FIG. 2, a transparent base 4 (for example, a high-transmissivity polyethylene terephthalate, or PET film) with 45 μm in thickness "t2" is set on the UV-curable resin 3 at the level "A". The base 4 is then irradiated with UV rays while being pressed in a direction depicted by an arrow so that the resin 3 is cured and bonded to the base 4.

The transparent base 4 is then peeled off or removed from the metal mold 2, as shown in FIG. 3, in a direction depicted by an arrow.

Obtained in this process is a microlens array base structure 8 formed on the transparent base 4, as having a microlens array 7 via a transparent layer 5, both made of the UV-cured resin 3. The microlens array 7 has a plurality of closestpacked, convex and semisphere-like shape microlenses 6 each with 50 μm in radius "r1", aligned at a pitch "L1" of 100 μm. The height "t1" of the resin 3 and also the pressure in radiation of UV rays are adjusted to give a thickness "t3" of 5 μm to the transparent layer 5. The resin 3 exhibits 1.51 in refractive index "$n_1$" after UV-cured.

Figure 4A:
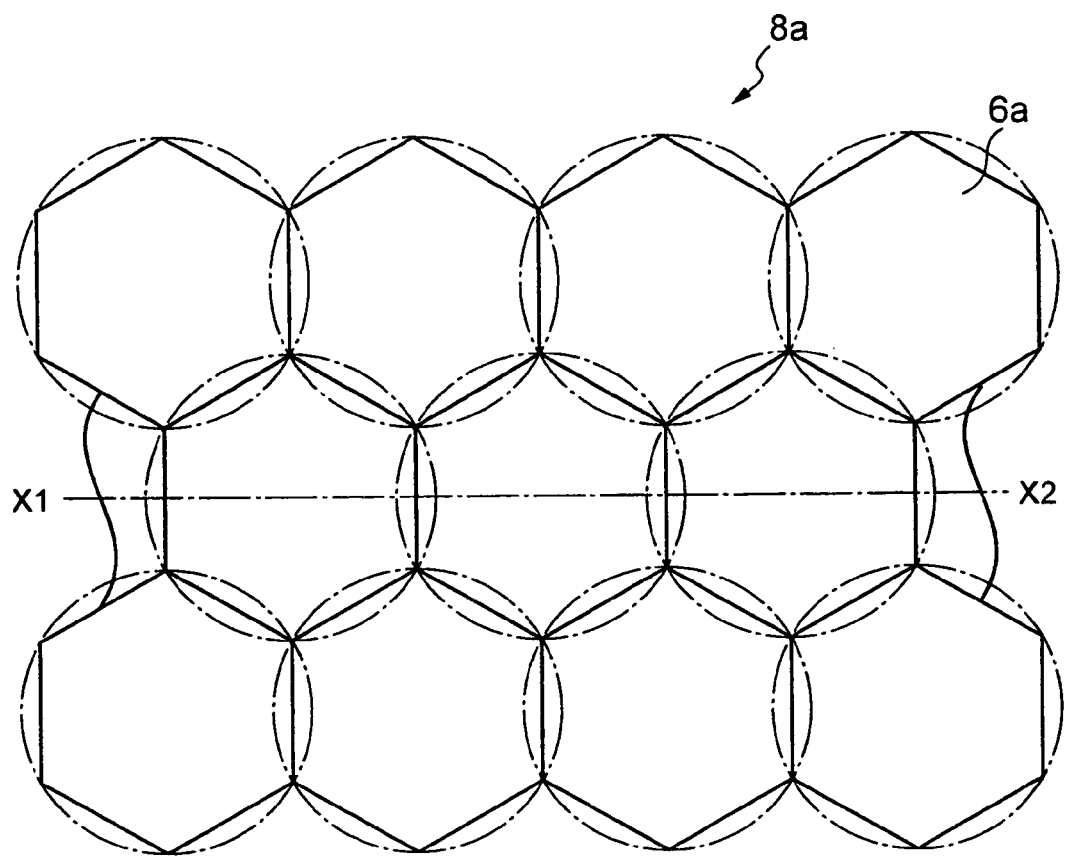
FIGS. 4A and 4B are schematic plan and sectional views, respectively, illustrating an alternative for closest-packed arrangement of microlenses.
Figure 4B:
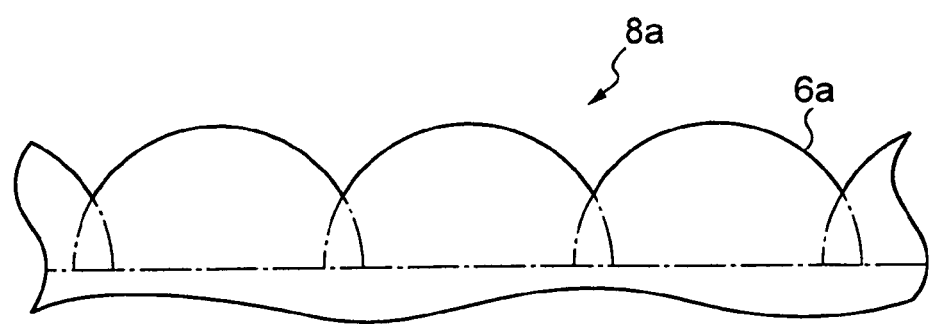

Illustrated in FIGS. 4A and 4B is an alternative for closestpacked arrangement of microlenses. In the figures, semisphere-like shape microlenses 6a each having an othohexagonal-like bottom are arranged in a honeycomb pattern in a microlens array base structure 8a.

The succeeding processes will be disclosed as applied to the microlens array base structure 8 having the semispherelike shape microlenses 6 each having a circular-like bottom arranged in a honeycomb pattern. However, the same processes can also be applied to the microlens array base structure 8a shown in FIGS. 4A and 4B, or any other microlens array base structures having closest-packed microlenses each having a bottom of any shape, such as a triangular-, square-like bottom, etc.

(Second Process)

Figure 5:
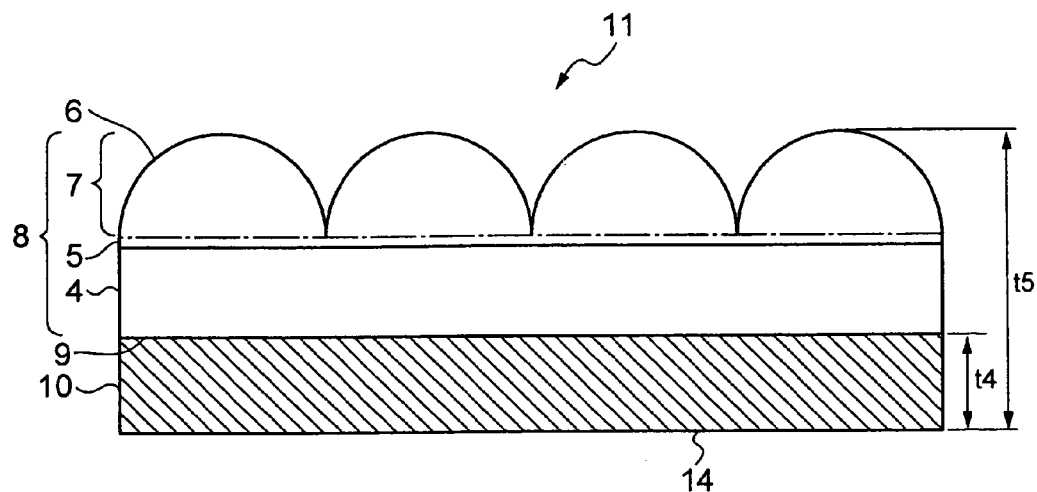
FIG. 5 is a schematic sectional view illustrating a second process in the first preferred embodiment of a method of producing a microlens array sheet according to the present invention.

The second process (formation of a light-shielding layer on the transparent base) will be disclosed with reference to FIG. 5.

A UV-curable resin (that becomes an adhesive layer 9), the same as the resin 3 used in the first process, is applied onto a surface of the microlens array base structure 8, which is opposite to the surface with the microlens array 7 formed thereon. In this process, the resin is applied at a thickness which can be ignored in the total thickness in the structure.

Prepared in this process is a light-absorptive light-shielding layer 10 having a thickness "t4" of 50 μm made of, for example, a PET film including light-absorptive carbon black at a high percentage.

The light-shielding layer 10 is attached to the microlens array base structure 8 via the adhesive layer 9, with a laminator (not shown). The base structure 8 is then irradiated with non-collimated UV rays via the microlens array 7 so that the UV-curable resin is cured which causes the light-shielding layer 10 to be bonded to the base structure 8 via the adhesive layer 9.

Produced in this process is a microlens array and lightshielding layer base structure 11 having the total thickness "t5" of about 150 μm.

When a microlens-array sheet made of the microlens array and light-shielding layer base structure 11 is used in a rearprojection display, a light beam to be projected as an image is incident to the structure 11 via the microlens array 7 and then emitted therefrom via the light-shielding layer 10. This surface 14 of the layer 10 via which the light beam is emitted is referred to as a beam-outgoing surface in the following disclosure.

Through the first and second processes in the first embodiment, the microlens array 7 is formed first on one side of the transparent base 4 and then the light-shielding layer 10 on the other side of the base 4. However, the order of processes can be reversed in a way that the light-shielding layer 10 is formed first on one side of the base 4 and then the array 7 on the other side.

(Third Process)

Figure 6:
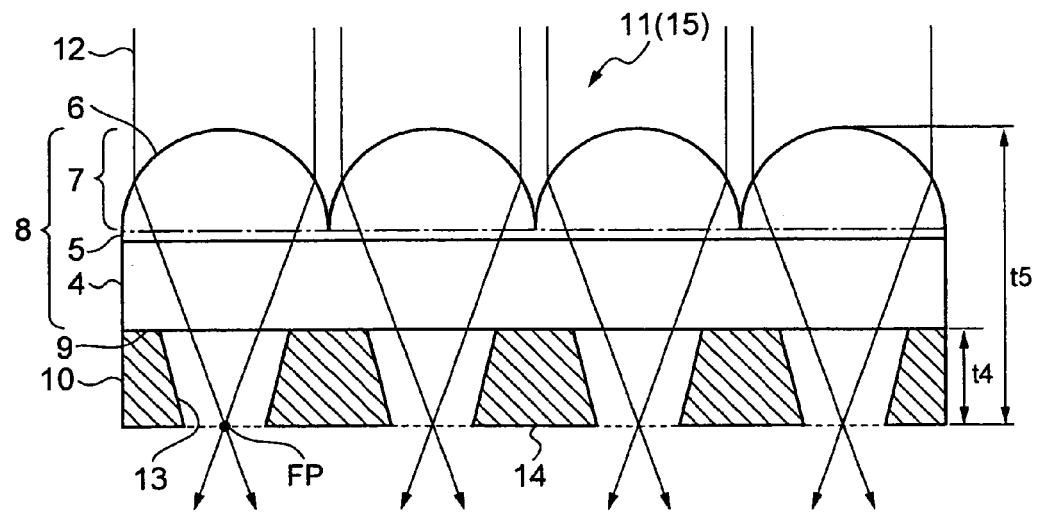
FIG. 6 is a schematic sectional view illustrating a third process in the first preferred embodiment of a method of producing a microlens array sheet according to the present invention.

The third process (self-alignment formation of apertures to the light-shielding layer) will be disclosed with reference to FIG. 6.

As shown in FIG. 6, the microlens array and light-shielding layer base structure 11 is irradiated with a laser beam 12 from a $CO_2$ (carbon dioxide gas) laser at an average power of 30 watts. The laser beam 12 is emitted so that it is incident via the microlens array 7 in a direction orthogonal to the beamoutgoing surface 14 of the light-shielding layer 10.

A much higher power for the laser beam 12 could damage the microlenses 6 by melting, sublimation or ablation (which will be discussed layer). The diameter of a laser spot of the beam 12 is thus adjusted so that minute self-aligned apertures 13 can be formed in the light-shielding layer 10, with no damages to the microlenses 6. There are the optimum requirements for the laser-spot adjustments, which will be discussed layer.

The laser beam 12 adjusted under the optimum requirements is incident to the light-shielding layer 10 via the microlens array 7, the transparent layer 5, and the transparent base 4. It removes a part of the layer 10 by melting, sublimation or ablation to form a plurality of self-aligned apertures 13, thus a microlense array sheet 15 (the first embodiment) being produced, as shown in FIG. 6. The optical axis of each microlense 6 and the center line (orthogonal to the layer 10) of the corresponding aperture 13 almost match each other.

Although discussed later in detail, the total thickness "t5" of the microlense array sheet 15 is adjusted so that a focal point "FP" of each microlense 6 is located in the vicinity of the beam-outgoing surface 14 of the light-shielding layer 10, as shown in FIG. 6.

The term "ablation" is defined as explosive removal of a solid matter, such as, an organic or inorganic substance and a metal, with plasma emission and sonic boom. It happens due to evaporation caused by absorption heat generated when the solid matter is irradiated with a powerful laser beam.

Disclosed below in detail is a laser-processing method for the self-aligned apertures 13, with reference to FIG. 7. FIG. 7 will again be referred to with parenthetic reference numerals and signs in a second embodiment, which will be disclosed later.

Figure 7:
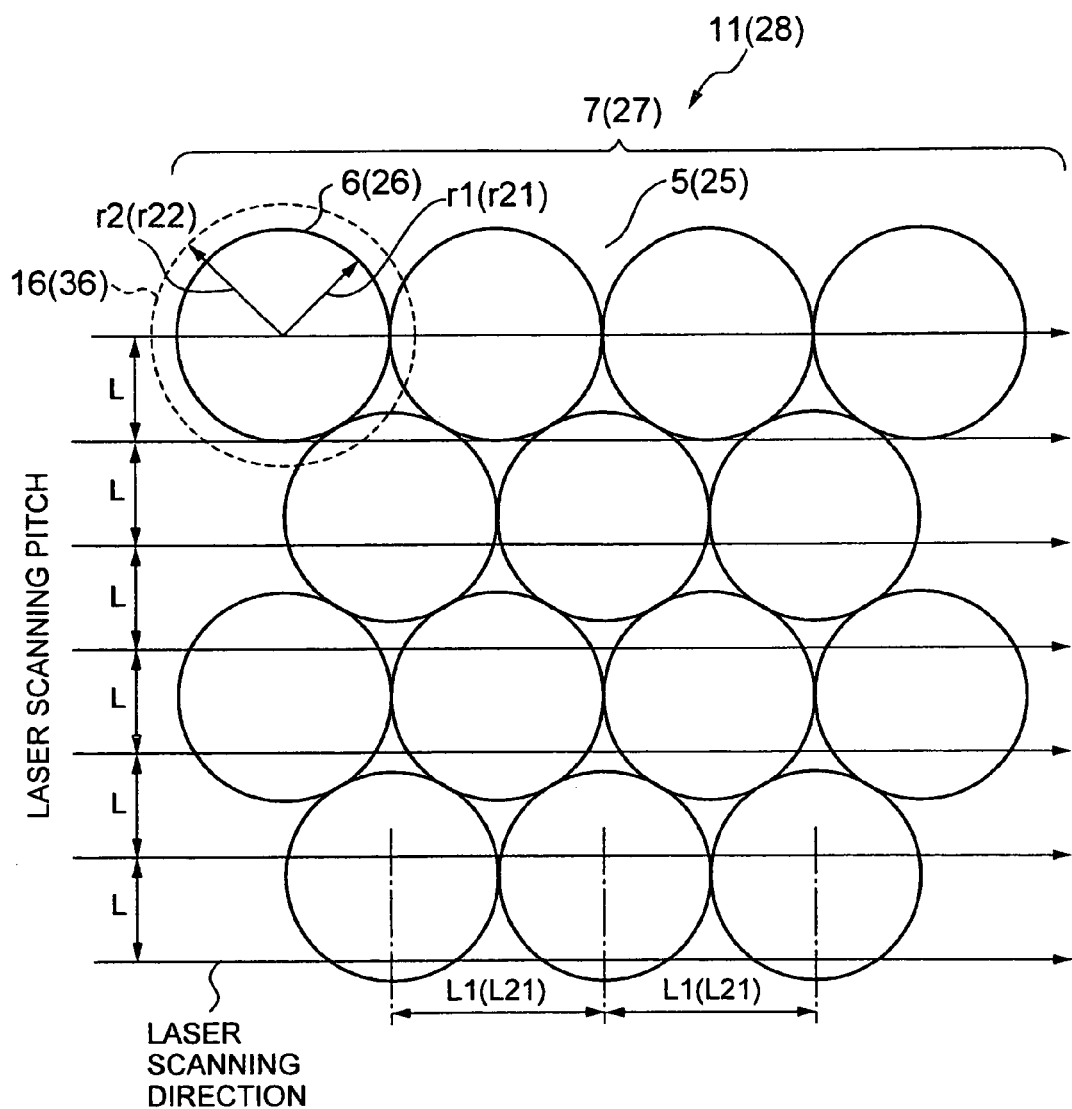
FIG. 7 is a schematic plan view illustrating laser processing in the third process in the first preferred embodiment (and also in a second process in a second preferred embodiment) of a method of producing a microlens array sheet according to the present invention.

The laser beam 12 is adjusted so that a laser spot 16 has a radius "r2" larger than a radius "r1" of each microlens 6, as illustrated in FIG. 7. The microlens array and light-shielding layer base structure 11 is then irradiated with the beam 12 such that the beam 12 is incident via the microlens array 7 in a direction orthogonal to the beam-outgoing surface 14 of the light-shielding layer 10. The beam 12 scans over the structure 11 at a scanning pitch "L", for example, in a direction parallel to a direction in which the microlenses 6 are aligned, thus forming a plurality of self-aligned apertures 13, such as, shown in FIG. 6.

Discussed next is the shape of the self-aligned apertures 13 versus the scanning pitch "L" (one laser-processing requirement) of the laser beam 12.

Different self-aligned apertures 13 were formed according to the following four scanning-pitch requirements and observed under a transmission optical microscope and a laser microscope:

(A) scanning pitch: La=50 μm
(B) scanning pitch: Lb=40 μm
(C) scanning pitch: Lc=20 μm, and
(D) scanning pitch: Ld=10 μm Each scanning pitch was achieved at a constant scanning speed of 10 m/s and a constant radius "r2" of 50 μm or larger for the laser spot 16. The diameter of 2×r2 ($\geq$100 μm) of the spot 16 was much larger than each scanning pitch "L" ($\leq$50 μm), for almost uniform laser intensity distribution over the microlens array 7. The radius "r1" of each microlens 6 was 50 μm under each laser-processing (scanning-pitch) requirement.

FIGS. 8A to 8D show illustrative sectional views for self-aligned apertures 13a to 13d, respectively, which were formed at the laser scanning pitches La to Ld, respectively.

Figure 8A:
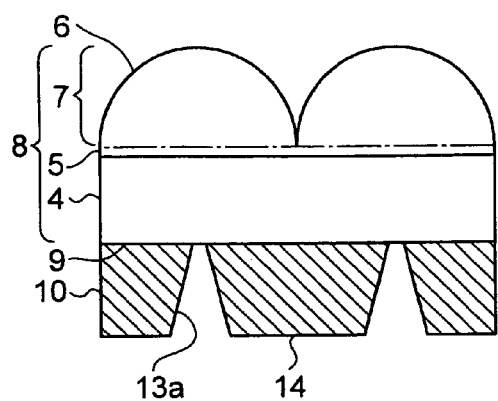
FIGS. 8A to 8D are schematic sectional views for several self-aligned apertures having different sectional shapes depending on laser-processing requirements in the first preferred embodiment.
Figure 8B:
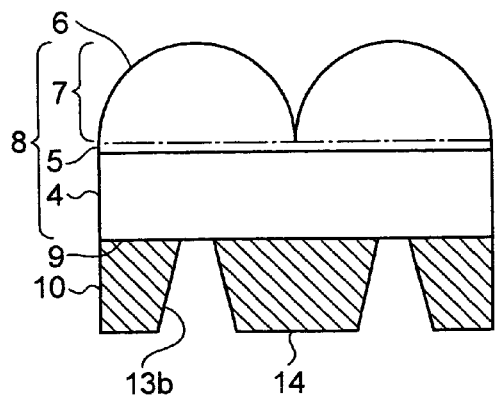

The sectional shape of each of the self-aligned apertures 13a and 13b formed under the laser-processing requirements (A) and (B), respectively, shown in FIGS. 8A and 8B, respectively, is a conical trapezoid. This shape is sometimes referred to as a "normal" conical trapezoid in which the size of each aperture on the microlense array 7 side is smaller than that on the opposite side.

Figure 8C:
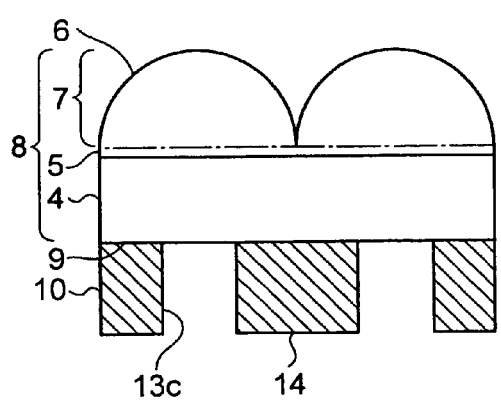

The sectional shape of the self-aligned apertures 13c formed under the laser-processing requirement (C) and shown in FIG. 8C is a circular cylinder.

Figure 8D:
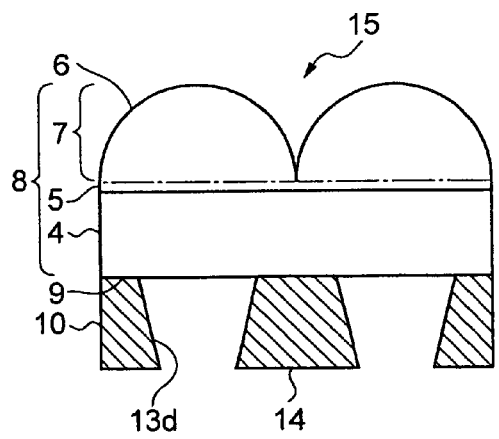

The sectional shape of the self-aligned apertures 13d formed under the laser-processing requirement (D) and shown in FIG. 8D is a conical trapezoid. This shape is sometimes referred to as a "reverse" conical trapezoid in which the size of each aperture on the microlense array 7 side is larger than that on the opposite side.

FIGS. 8A to 8D teach that the sectional shape of the self-aligned apertures in the light-shielding layer 10 depends on the laser-processing requirements.

Discussed next with respect to FIGS. 9A to 9E is why the self-aligned apertures in the light-shielding layer 10 exhibit different sectional shapes depending on the laser-processing requirements. FIGS. 9A to 9D correspond to the above-listed laser-processing (scanning-pitch) requirements (A) to (D), respectively.

The microlens array and light-shielding layer base structure 11 is irradiated with the laser beam 12 such that the beam 12 is incident via the microlens array 7 in a direction orthogonal to the beam-outgoing surface 14 of the light-shielding layer 10.

Figure 9A:
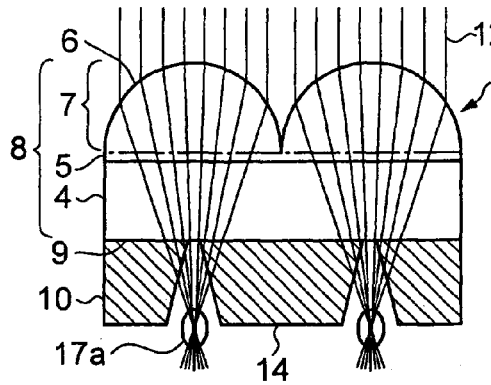
FIGS. 9A to 9E are schematic sectional views illustrating distribution of a thermal energy source depending on laser-processing requirements in the first preferred embodiment.
Figure 9B:
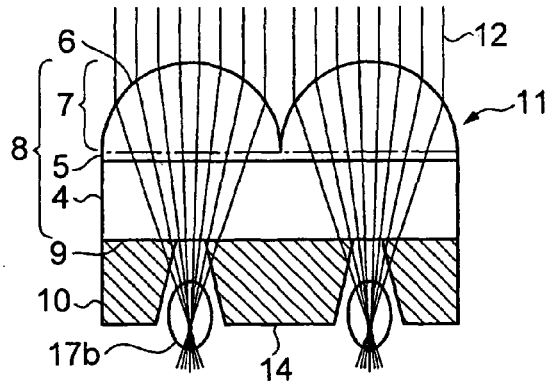
Figure 9C:
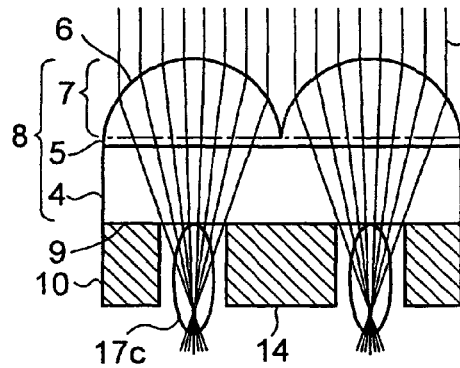
Figure 9D:
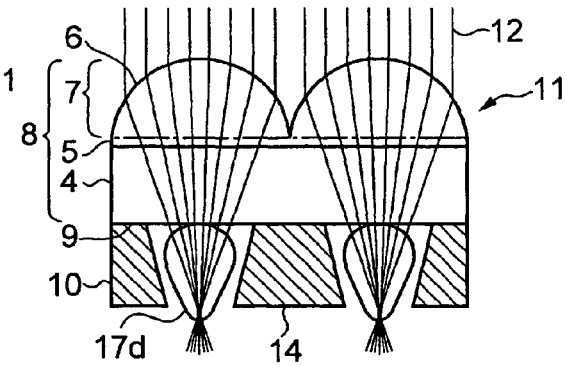
Figure 9E:
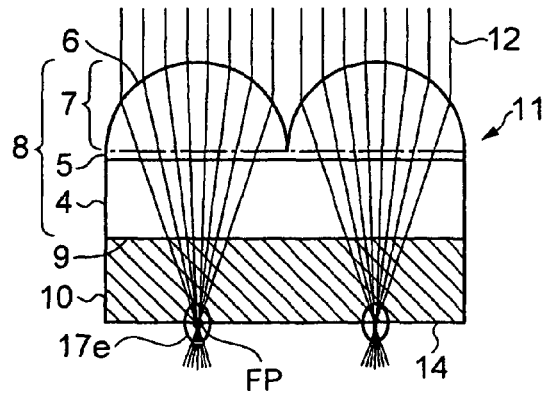

As illustrated in FIG. 9E, the laser beam 12 deflected due to a convex-lens function of each microlens 6 is converged as reaching a focal point "FP". As the light energy density increases at the focal point "FP", the thermal energy increases at the same point. In addition, the light-shielding layer 10 of color in black efficiently absorbs the beam 12. The increased thermal energy becomes a thermal energy source 17e.

The thermal energy source 17e causes removal of a part of the light-shielding layer 10, by melting, sublimation or ablation, in the vicinity of the focal point "FP" (almost on the beam-outgoing surface 14 of the layer 10), which spreads towards the microlens array 7. The narrower the laser scanning pitch "L", the larger the thermal energy, and hence, the wider the thermal energy source 17a to 17d along the laser path, from FIGS. 9A to 9D, respectively.

This is a possible reason why the self-aligned apertures 13d were formed as a "reverse" conical trapezoid in its section at the scanning pitch "Ld" of 10 μm under the laser-processing (scanning-pitch) requirement (D).

The thermal energy given by the laser beam 12 increases under the laser-processing (scanning-pitch) requirements in the order from (A) to (D), with the wider thermal energy sources from 17a to 17d, as shown from FIGS. 9A to 9D. This is a possible reason why the self-aligned apertures 13a to 13d were formed as having the different sectional shapes, as shown FIGS. 9A to 9D, respectively.

Moreover, the inventors of the present invention have confirmed that self-aligned apertures of almost an elliptic conical trapezoid in its sectional shape can be formed when semi-spherical microlenses cut from a spheroid material are used.

Accordingly, it is possible to form self-aligned apertures having a sectional shape that corresponds to a specific portion of each microlens that exhibits beam-converging effects.

Discussed next is the light transmission factor (in a visible-light range under consideration of relative visibility), the contrast of projected images, and the laser processability versus the sectional shape of self-aligned apertures.

Four samples in the table shown in FIG. 10 correspond to those shown in FIGS. 8A to 8D, respectively. The self-aligned apertures 13a to 13d of the four samples were observed in the sectional shape under a transmission optical microscope and a laser microscope. The light transmission factor was measured by an integrating sphere photometer for each sample. The contrast of projected images was evaluated by visual check using a rear projection television (made by Victor Company of Japan, Limited) for each sample. The laser processability was evaluated on reproducibility of the apertures 13a to 13d in the sectional shape.

The table in FIG. 10 teaches one processing requirement (D) that gives self-aligned apertures the reverse conical trapezoid, such as, shown in FIG. 8D. This processing requirement allows production of a high-performance microlens array sheet 15 that exhibits high transmissivity and high contrast for projected images.

In the first embodiment, the laser processing requirement (D) with the scanning pitch "Ld" of 10 μm gives the self-aligned apertures 13d having the reverse conical trapezoid, such as, shown in FIG. 8D. Not only that, the scanning pitch "Ld" in the range from 5 to 15 μm gives the self-aligned apertures almost the same reverse conical-trapezoid shape.

Discussed next with reference to the table in FIG. 11 is the light transmission factor, the contrast of projected images, and the laser processability versus the thickness "t4" of the light-shielding layer 10, for eight samples. The thickness "t4" was graded from 1 to 100 μm, for the eight samples, because "t4" thinner than 1 μm did not provide sufficient light shielding effects.

In the same way as discussed above, a $CO_2$ laser was adjusted to achieve an optimum scanning pitch "L" so that self-aligned apertures had the reverse conical trapezoid in their sectional shapes, such as, shown in FIG. 8D, for all of the eight samples.

The eight samples had the same shape and material as those shown in FIG. 10, for the microlenses 6. The thicknesses "t2" and "t4" of the transparent base 4 and the light-shielding layer 10, respectively, were adjusted in the eight samples so that the focal point "FP" of each microlens 6 was located in the vicinity of the beam-outgoing surface 14 of the layer 10.

Shown in the table in FIG. 11 are that all of the eight samples exhibited the light transmission factor of over 90%, with variation in the contrast and laser processability.

The table in FIG. 11 teaches that adjustments to the thickness "t4" of the light-shielding layer 10 within the range from 1 to 75 µm, preferably, from 2 to 50 µm, allows production of a high-performance microlens array sheet 15 that gives high contrast images, with high laser processability.

Moreover, the inventors of the present invention have devoted themselves to examine the results discussed above and found a proportional relationship between the optimum thickness of the light-shielding layer 10 and the radius "r1" of each microlens 6.

In detail, the radius "r1" of each microlens 6 is, for example, 50 µm, in the first embodiment. Under the proportional relationship, the ranges from 1 to 75 µm and 2 to 50 µm for the thickness "t4" of the light-shielding layer 10 can be expressed as from 1 to 1.5×r1 µm and 2 to r1 µm, respectively.

Figure 12A:
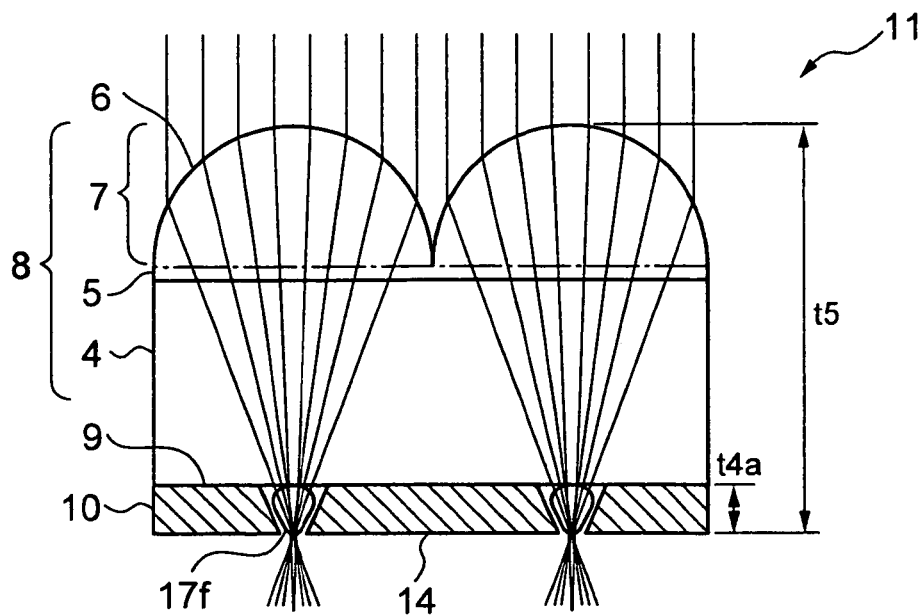
FIGS. 12A and 12B are schematic sectional views illustrating distribution of a thermal energy source and the shape of apertures in a light-shielding layer versus the thickness of a light-shielding layer in the first preferred embodiment.
Figure 12B:
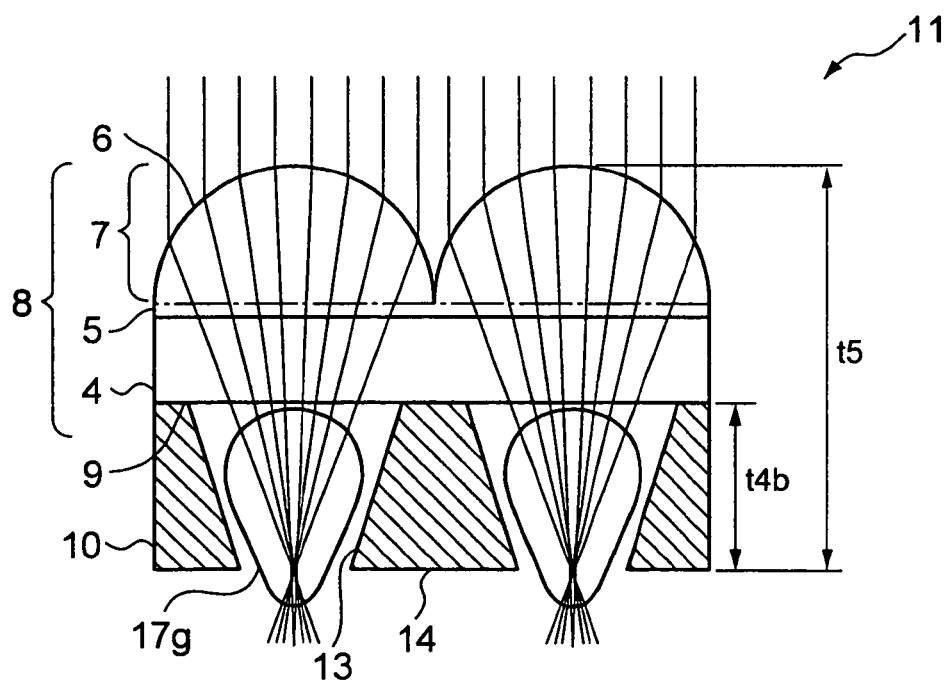

Illustrated in FIGS. 12A and 12B are sectional views of the microlens array and light-shielding layer base structure 11 having the light-shielding layer 10 with a thin thickness "t4a" and a thick thickness "t4b", respectively.

The light-shielding layer 10 with the thin thickness "t4a" in FIG. 12A requires a smaller energy, in laser processing, than that with the thick thickness "t4b" in FIG. 12B. Such a smaller energy gives a smaller size to the openings of the beam-outgoing surface 14 of the layer 10, which serves to enhance contrast. Nevertheless, the thin thickness "t4a" inevitably lowers light shielding effects, thus lowering the total contrast for images to be projected.

In contrast, the light-shielding layer 10 with the thick thickness "t4b" in FIG. 12B suffers low laser processability than that shown in FIG. 12A, resulting in variation in shape of the self-aligned apertures 13, and hence variation in transmissivity.

Therefore, a preferable range for the thickness "t4" of the light-shielding layer 10, when the radius "r1" of each microlens 6 is 50 µm (the first embodiment), is from 1 to 75 µm, or from 1 to 1.5×r1 µm, more preferably, from 2 to 50 µm, or from 2 to r1 µm.

Disclosed next, with reference to FIGS. 13 to 19C is a second embodiment of a production method according to the present invention.

A microlens sheet produced by the second embodiment of a production method is equipped with a microlens array provided on a light-absorptive light-shielding base.

The production method, as the second embodiment, includes formation of a microlens array on a light-absorptive light-shielding base (a first process) and self-alignment formation of apertures to the base (a second process).

(First Process)

Figure 13:
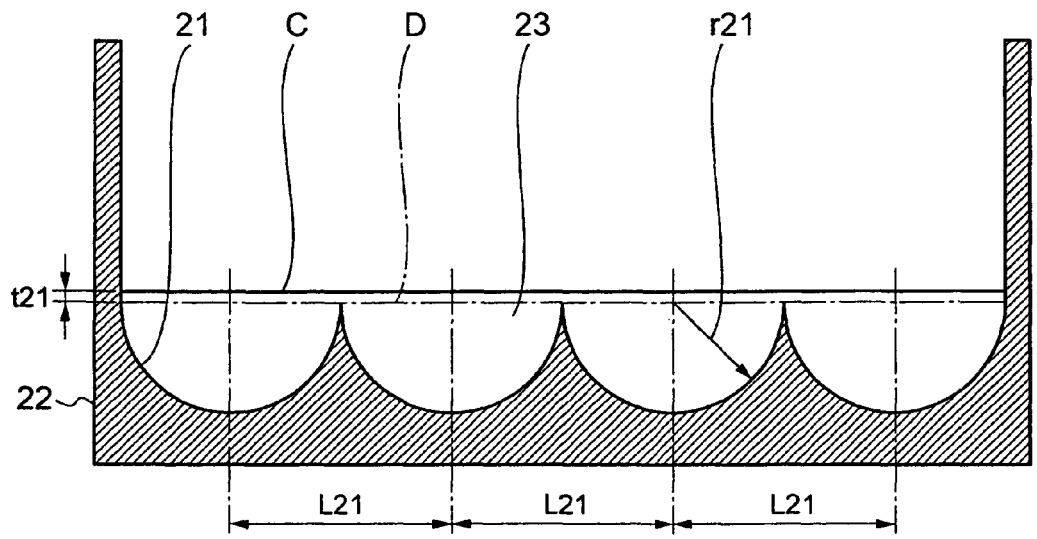
FIG. 13 is a schematic sectional view illustrating a first process in a second preferred embodiment of a method of producing a microlens array sheet according to the present invention.
Figure 14:
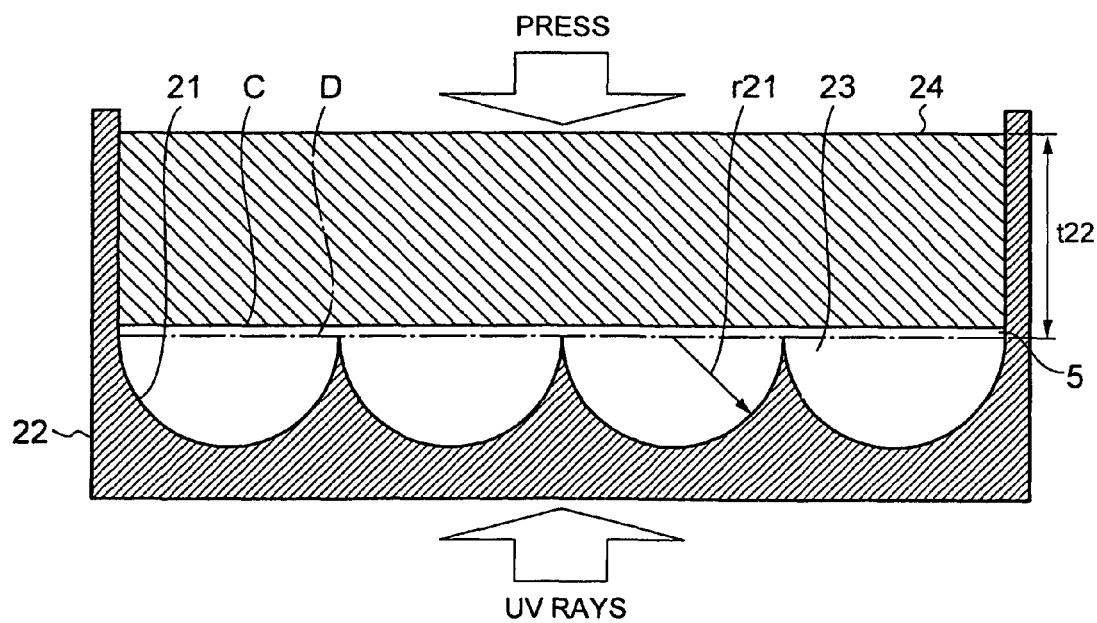
FIG. 14 is a schematic sectional view illustrating the first process in the second preferred embodiment of a method of producing a microlens array sheet according to the present invention.
Figure 15:
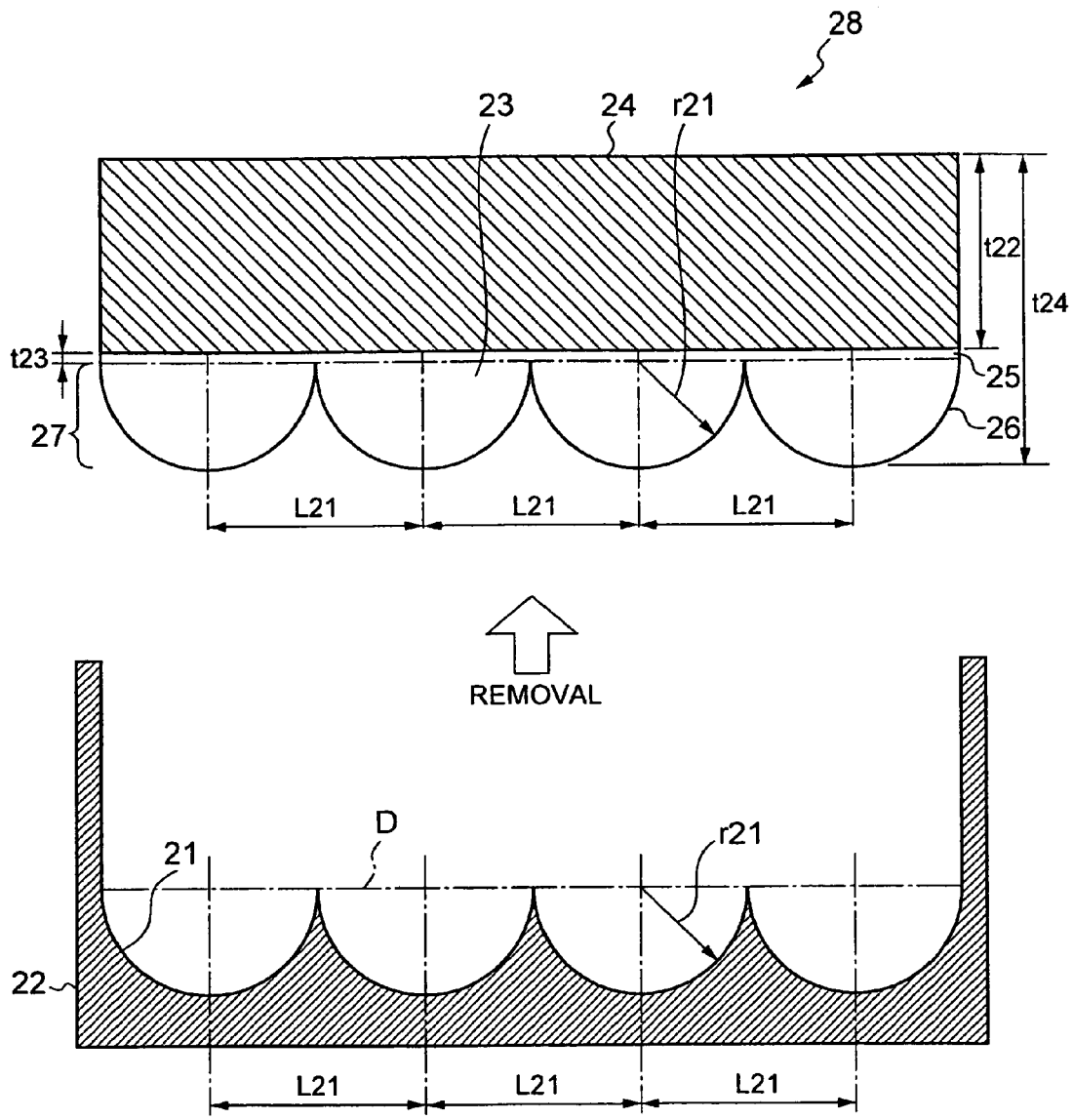
FIG. 15 is a schematic sectional view illustrating the first process in the second preferred embodiment of a method of producing a microlens array sheet according to the present invention.

The first process (formation of a microlens array on a light-absorptive light-shielding base) will be disclosed with reference to FIGS. 13 to 15.

Prepared first is a glass mold 22 having a plurality of concave and semisphere-like shape sections 21 each with 25 µm in radius "r21", aligned at a pitch "L21" of 50 µm, by closest packing or injection, as shown in FIG. 11. The glass mold 22 is used for production of a microlens array, which will be disclosed later.

Injected into the semisphere-like shape sections 21 is a UV-curable resin 23 that exhibits about 180 mPa·s in viscosity and 90% or higher in light transmissivity when cured. Employed as the resin 23 in this embodiment is TB3087B made by Three Bond. Co., Ltd.

Not only glass, the mold 22 may be made of any material, such as, plastic, that is transparent to UV rays.

The concave and semisphere-like shape sections 21 may be formed in the glass mold 22 by microblasting, wet etching, etc.

The amount of the UV-curable resin 23 to be injected is adjusted so that the level "C" of the resin 23 is higher, by a height "t21", than the level "D" of the opening of each semisphere-like shape section 21 of the glass mold 22. Although disclosed layer, the thickness of a transparent layer which is formed in the later stage is adjusted with the height "t21" of the resin 23 and also pressure in radiation of UV rays.

Although, the glass mold 22 has more semisphere-like shape sections 21 in actual application, it is shown in FIG. 13 as having just four sections 21 for simple illustration of its shape in cross section. This is also true for the other drawings.

Next, as shown in FIG. 14, a light-absorptive light-shielding base 24 (for example, a black PET film) with 45 µm in thickness "t22" is set on the UV-curable resin 23 at the level "C". The resin 23 is then irradiated with non-collimated UV rays via the glass mold 22 while being pressed via the base 24 so that the resin 23 is cured and bonded to the base 24.

The light-shielding base 24 is then peeled off or removed from the glass mold 22, as shown in FIG. 15, in a direction depicted by an arrow.

Obtained in this process is a microlens array base structure 28 formed on the light-shielding base 24, as having a microlens array 27 via a transparent layer 25, both made of the UV-cured resin 23. The microlens array 27 has a plurality of closest-packed, convex and semisphere-like shape microlenses 26 each with 25 µm in radius "r21", aligned at a pitch "L21" of 50 µm. The height "t21" of the resin 23 and also the pressure in radiation of UV rays are adjusted to give a thickness "t23" of 5 µm to the transparent layer 25. The resin 23 exhibits 1.51 in refractive index "$n_1$" after UV-cured. The total thickness "t24" of the microlens array base structure 28 is about 75 µm.

When a microlens-array sheet made of the microlens array base structure 28 is used in a rear-projection display, a light beam to be projected as an image is incident to the structure 28 via the microlens array 27 and then emitted from a surface of the light-shielding base 24, on the opposite side of the base 24 with respect to the array 27. This surface 34 (shown in FIG. 16) of the base 24 via which the light beam is emitted is referred to as a beam-outgoing surface in the following disclosure.

Illustrated in FIGS. 4A and 4B can further be applied to the second embodiment as an alternative for closest-packed arrangement of microlenses. In addition, any other microlens array base structures having closest-packed microlenses each having a bottom of any shape, such as a triangular-, square-like bottom, etc., can be applied to the second embodiment.

The succeeding processes will be disclosed as applied to the microlens array base structure 28 having the closest-packed semisphere-like shape microlenses 26 each having a circular-like bottom arranged in a honeycomb pattern. However, the same processes can also be applied to other microlens array base structures, such as, shown in FIGS. 4A and 4B.

(Second Process)

Figure 16:
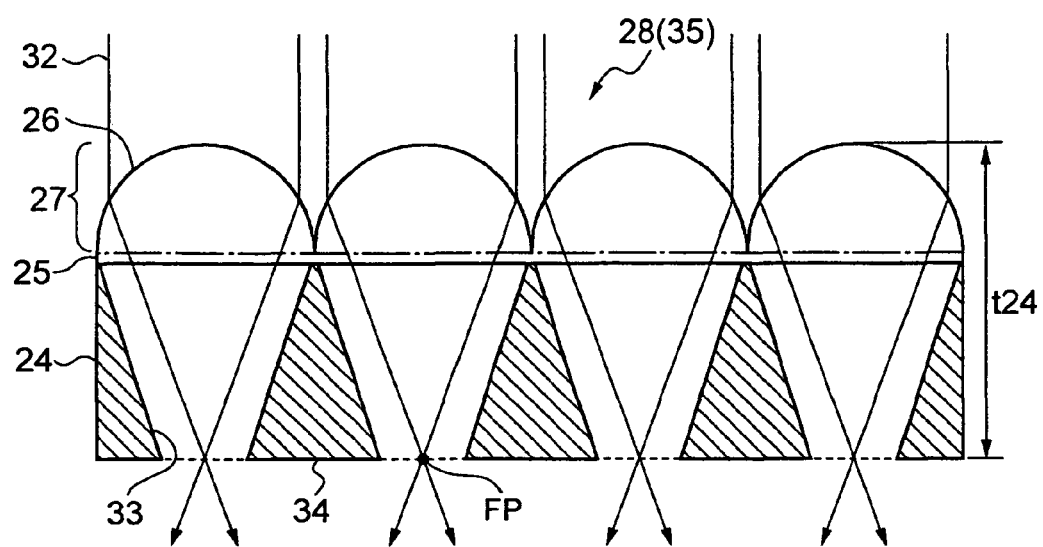
FIG. 16 is a schematic sectional view illustrating a second process in the second preferred embodiment of a method of producing a microlens array sheet according to the present invention.

The second process (self-alignment formation of apertures to the light-absorptive light-shielding base) will be disclosed with reference to FIGS. 16 to 17D.

As shown in FIG. 16, the microlens array base structure 28 is irradiated with a laser beam 32 from a $CO_2$ (carbon dioxide gas) laser at an average power of 30 watts. The laser beam 32 is emitted so that it is incident via the microlens array 27 in a direction orthogonal to the beam-outgoing surface 34 of the light-shielding base 24.

A much higher power for the laser beam 32 could damage the microlenses 26 by melting, sublimation or ablation, like discussed in the first embodiment. The diameter of a laser spot of the beam 32 is thus adjusted so that minute self-aligned apertures 33 can be formed in the light-shielding base 24, with no damages to the microlenses 26. There are the optimum requirements for the laser-spot adjustments, which will be discussed layer.

The laser beam 32 adjusted under the optimum requirements is incident to the light-shielding base 24 via the microlens array 27 and the transparent layer 25. It removes a part of the base 24 by melting, sublimation or ablation to form a plurality of self-aligned apertures 33, thus a microlense array sheet 35 (the second embodiment) being produced, as shown in FIG. 16. The optical axis of each microlense 26 and the center line (orthogonal to the base 24) of the corresponding aperture 33 almost match each other.

Although discussed later in detail, the total thickness "t24" of the microlense array sheet 35 is adjusted so that a focal point "FP" of each microlense 26 is located in the vicinity of the beam-outgoing surface 34 of the light-shielding base 24, as shown in FIG. 16.

A laser-processing method for the self-aligned apertures 33 is the same as that for the counterparts 13 explained with reference to FIG. 7 in the first embodiment, thus explanation thereof being omitted.

Discussed next is the shape of the self-aligned apertures 33 versus the scanning pitch "L" (one laser-processing requirement) of the laser beam 32.

Different self-aligned apertures 33 were formed according to the following four scanning-pitch requirements and observed under a transmission optical microscope and a laser microscope:

(E) scanning pitch: Le=25 µm
(F) scanning pitch: Lf=20 µm
(G) scanning pitch: Lg=20 µm, and
(H) scanning pitch: Lh=5 µm As illustrated in FIG. 7, each scanning pitch was achieved at a constant scanning speed of 20 m/s and a constant radius "r22" of 25 µm or larger for a laser spot 36. The diameter of 2×r22 ($\cong$50 µm) of the spot 36 was much larger than each scanning pitch "L" ($\leqq$25 µm), for almost uniform laser intensity distribution over the microlens array 27. The radius "r21" of each microlenses 26 was 25 µm under each laser-processing (scanning-pitch) requirement.

FIGS. 17A to 17D show illustrative sectional views for self-aligned apertures 33a to 33d, respectively, which were formed at the laser scanning pitches Le to Lh, respectively.

The sectional shape of each of the self-aligned apertures 33a and 33b formed under the laser-processing requirements (E) and (F), respectively, shown in FIGS. 17A and 17B, respectively, is a conical trapezoid. This shape is sometimes referred to as a "normal" conical trapezoid in which the size of each aperture on the microlense array 27 side is smaller than that on the opposite side.

The sectional shape of the self-aligned apertures 33c formed under the laser-processing requirement (G) and shown in FIG. 17C is a circular cylinder.

The sectional shape of the self-aligned apertures 33d formed under the laser-processing requirement (H) and shown in FIG. 17D is a conical trapezoid. This shape is sometimes referred to as a "reverse" conical trapezoid in which the size of each aperture on the microlense array 27 side is larger than that on the opposite side.

FIGS. 17A to 17D teach that the sectional shape of the self-aligned apertures in the light-shielding base 24 depends on the laser-processing requirements.

The reason why the self-aligned apertures in the light-shielding base 24 exhibit different sectional shapes depending on the laser-processing requirements is the same as that discussed with reference to FIGS. 9A to 9E in the first embodiment.

The inventors of the present invention have also confirmed in the second embodiment that self-aligned apertures of almost an elliptic conical trapezoid in its sectional shape can be formed when semispherical microlenses cut from a spheroid material are used.

Accordingly, it is possible to form self-aligned apertures having a sectional shape that corresponds to a specific portion of each microlens that exhibits beam-converging effects.

Discussed next, like in the first embodiment, is the light transmission factor (in a visible-light range under consideration of relative visibility), the contrast of projected images, and the laser processability versus the sectional shape of self-aligned apertures.

Four samples in the table shown in FIG. 18 correspond to those shown in FIGS. 17A to 17D, respectively. The self-aligned apertures 33a to 33d of the four samples were observed in the sectional shape under a transmission optical microscope and a laser microscope. The light transmission factor was measured by an integrating sphere photometer for each sample. The contrast of projected images was evaluated by visual check using a rear projection television (made by Victor Company of Japan, Limited) for each sample. The laser processability was evaluated on reproducibility of the apertures 33a to 33d in the sectional shape.

The table in FIG. 18 teaches one processing requirement (H) that gives self-aligned apertures the reverse conical trapezoid, such as, shown in FIG. 17D. This processing requirement allows production of a high-performance microlens array sheet 35 that exhibits high transmissivity and high contrast for projected images.

In the second embodiment, the laser processing requirement (H) with the scanning pitch "Lh" of 5 µm gives the self-aligned apertures 33d having the reverse conical trapezoid, such as, shown in FIG. 17D. Not only that, the scanning pitch "Lh" in the range from 2.5 to 7.5 µm gives the self-aligned apertures almost the same reverse conical-trapezoid shape.

Throughout the embodiments, the order of processes and the structures can be modified within the scope of the claims.

Microlenses applicable in the present invention are, for example, a spherical (including spheroid) microlens, an aspherical microlens, and a cluster microlens having a larger lens with a smaller lens formed therein. One requirement for such microlenses applicable in the present invention is that they have a curvature and a focal point is located in the vicinity of a beam-outgoing surface of a light-shielding layer or base attached to them.

It is preferable for a light-shielding layer tightly attached to a microlens array via a transparent base, like the first embodiment, to exhibit a light-shielding and -absorbing capability to a laser-beam wavelength to be used and a visible-light range.

A light-shielding base, like used in the second embodiment, is usually made of a resin composition with a pigment, such as, carbon black and titanium black, or a black dye, dispersed or dissolved therein. It is also preferable for such a light-shielding base to exhibit a light-shielding and -absorbing capability to a laser-beam wavelength to be used and a visible-light range.

One requirement for the microlens array sheet according to the present invention lies in the total thickness. The total thickness is defined as a distance from the lens summit to the beam-outgoing surface of the light-shielding layer via the transparent base (first embodiment) or to the beam-outgoing surface of the light-shielding base (second embodiment). The requirement is that the total thickness has to be adjusted so that a focal point of each microlens is located in the vicinity of the beam-outgoing surface of the light-shielding layer or base.

In detail, for a microlens having a radius of "R" and made of a transparent resin material that exhibits 1.5 in refractive index "$n_1$", a focal length "f" is 3×R which is given by the following expression:

$$f=n_1R/(n_1-n_0)=1.5R/0.5=3 \times R$$

wherein "$n_0$" is the refractive index of air that is about 1.0.

The focal point of each microlens has to be located in the vicinity of the beam-outgoing surface of the light-shielding layer or base, in this invention. It is, thus, required that the total thickness of the microlens sheet is adjusted at about 3×R, or almost equal to the focal length of each microlens.

Figure 19A:
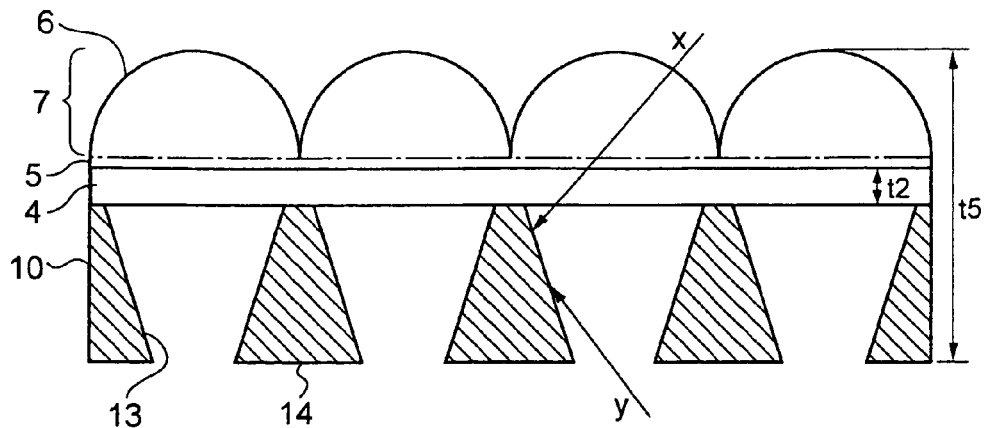
FIGS. 19A to 19C are schematic sectional views illustrating incidence of stray light and natural light to a microlens array sheet in the second preferred embodiment.
Figure 19B:
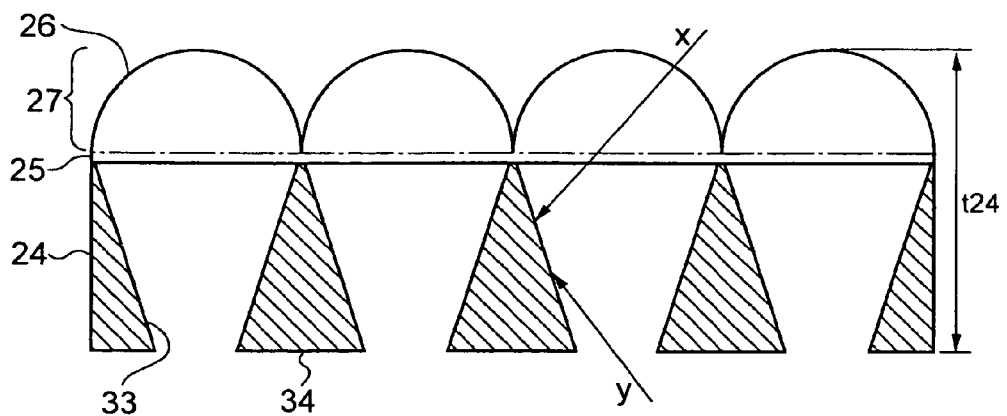
Figure 19C:
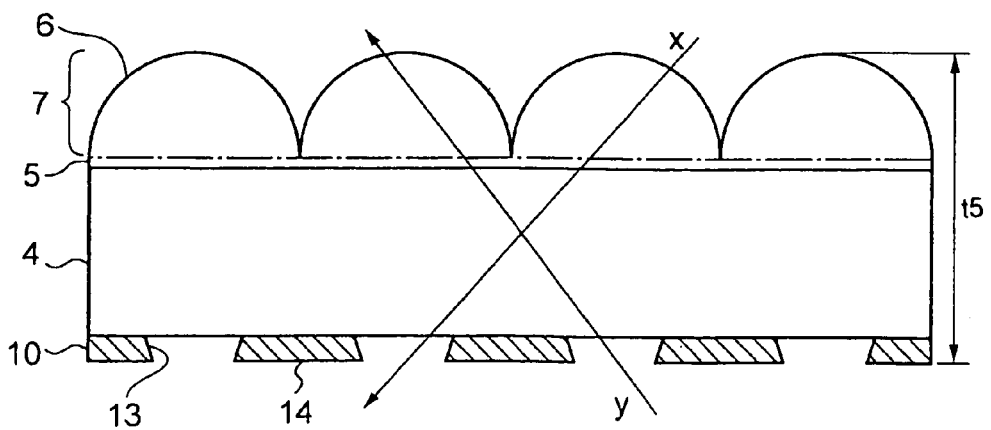

Moreover, the thickness "t2" of the transparent base 4 in the first embodiment may be thinner as illustrated in FIG. 19A. This structure and also the second embodiment, shown in FIG. 19B, without such a transparent base can restrict incidence of stray light "x", natural light "y", etc., illustrated in FIG. 19C.

The laser beams 12 and 32, in the first and second embodiments, respectively, are preferably adjusted to have r≧R and L≦R for the radius "r" of the laser spot and the laser scanning pitch "L", respectively, with respect to the radius "R" of each microlens.

Several modifications to the first and second embodiments will be disclosed with reference to FIGS. 20A to 21B.

Figure 20A:
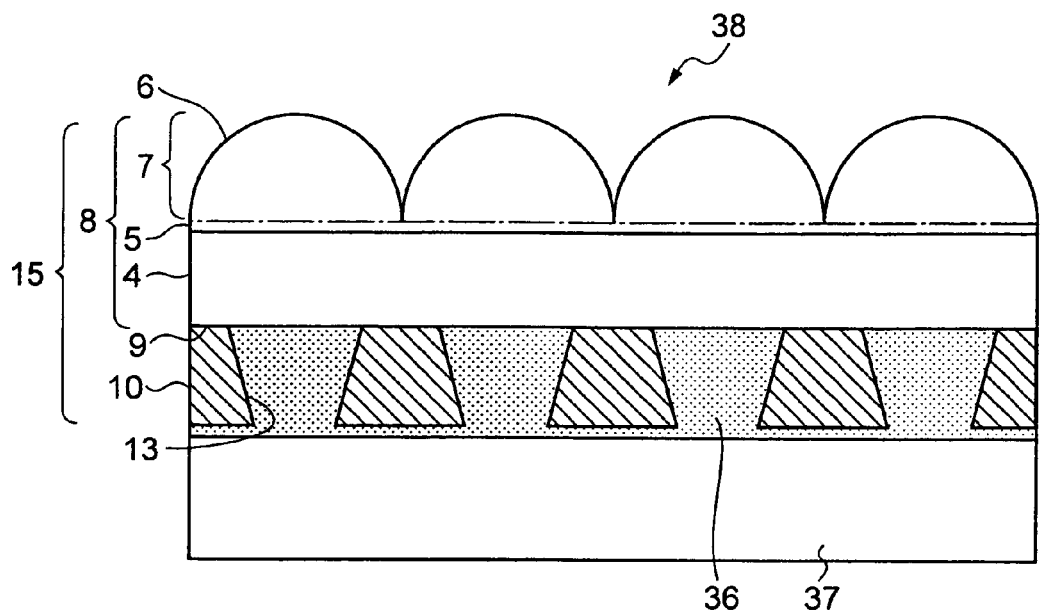
FIGS. 20A and 20B are schematic sectional views illustrating first modifications to the first and second preferred embodiments, respectively.

Illustrated in FIG. 20A is a microlens sheet 38 as a first modification to the first embodiment. Each self-aligned aperture 13 of the microlens sheet 15 (the first embodiment) is filled with a transparent resin ink 36. A transparent reinforcing base 37 having a thickness of, for example, 2 mm is attached to the light-shielding layer 10. The ink 36 is cured so that the base 37 is bonded to the microlens sheet 15. The microlens sheet 38 having the thick reinforcing base 37 exhibits higher mechanical strength than the microlens sheet 15.

Figure 20B:
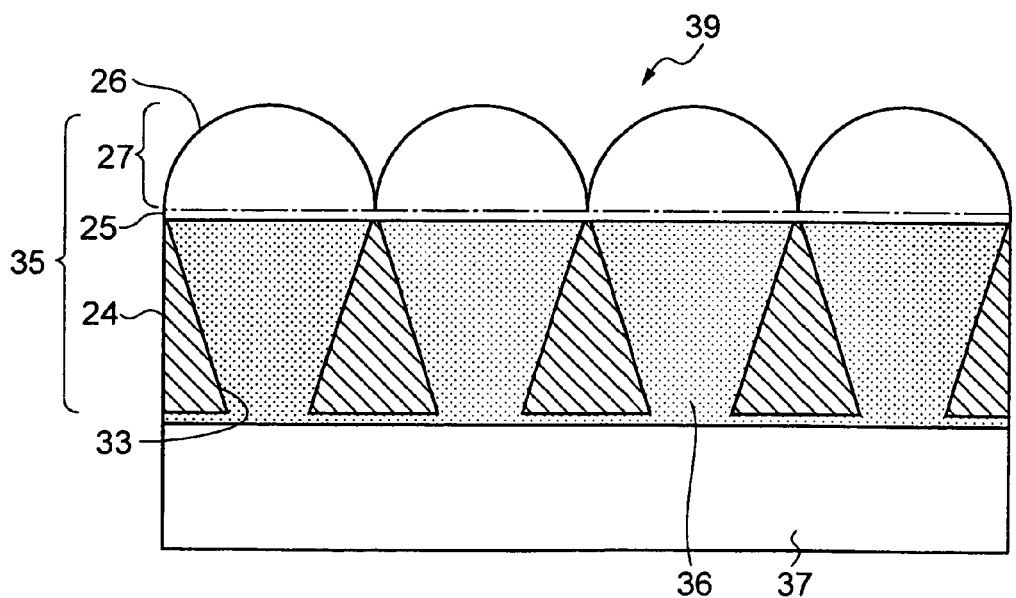

Illustrated in FIG. 20B is a microlens sheet 39 as a first modification to the second embodiment. Each self-aligned aperture 33 of the microlens sheet 35 (the second embodiment) is filled with a transparent resin ink 36. A transparent reinforcing base 37 having a thickness of, for example, 2 mm is attached to the light-shielding base 24. The ink 36 is cured so that the base 37 is bonded to the microlens sheet 35. The microlens sheet 39 having the thick reinforcing base 37 exhibits higher mechanical strength than the microlens sheet 35.

Figure 21A:
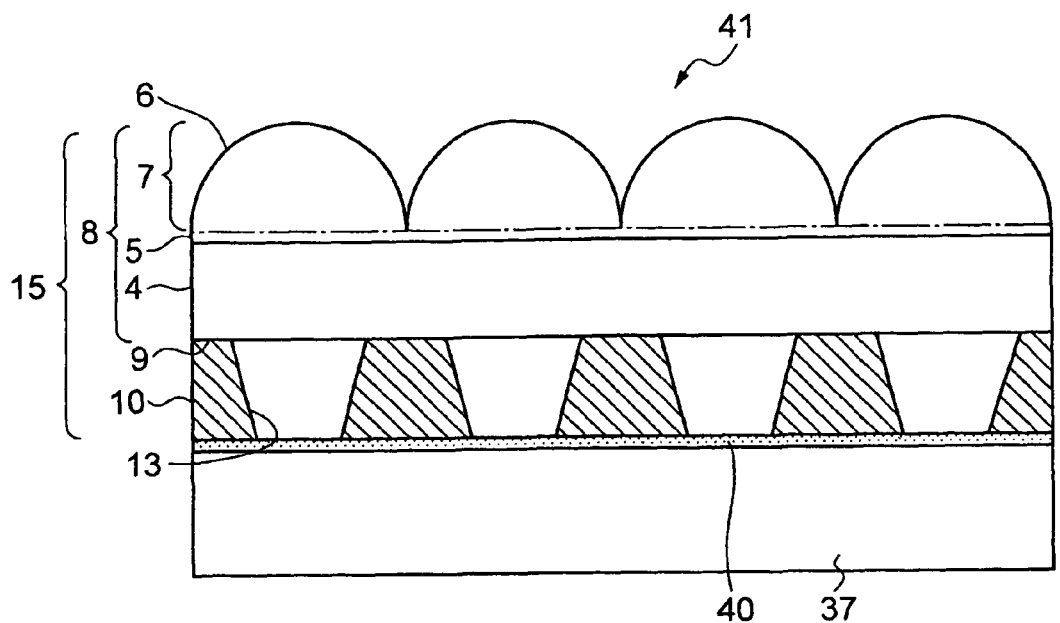
FIGS. 21A and 21B are schematic sectional views illustrating second modifications to the first and second preferred embodiments, respectively.

Illustrated in FIG. 21A is a microlens sheet 41 as a second modification to the first embodiment. A transparent reinforcing base 37 having a thickness of, for example, 2 mm is boned to the light-shielding layer 10 of the microlens sheet 15 (the first embodiment) via a transparent double-sided adhesive sheet 40. The microlens sheet 41 having the thick reinforcing base 37 exhibits higher mechanical strength than the microlens sheet 15.

Figure 21B:
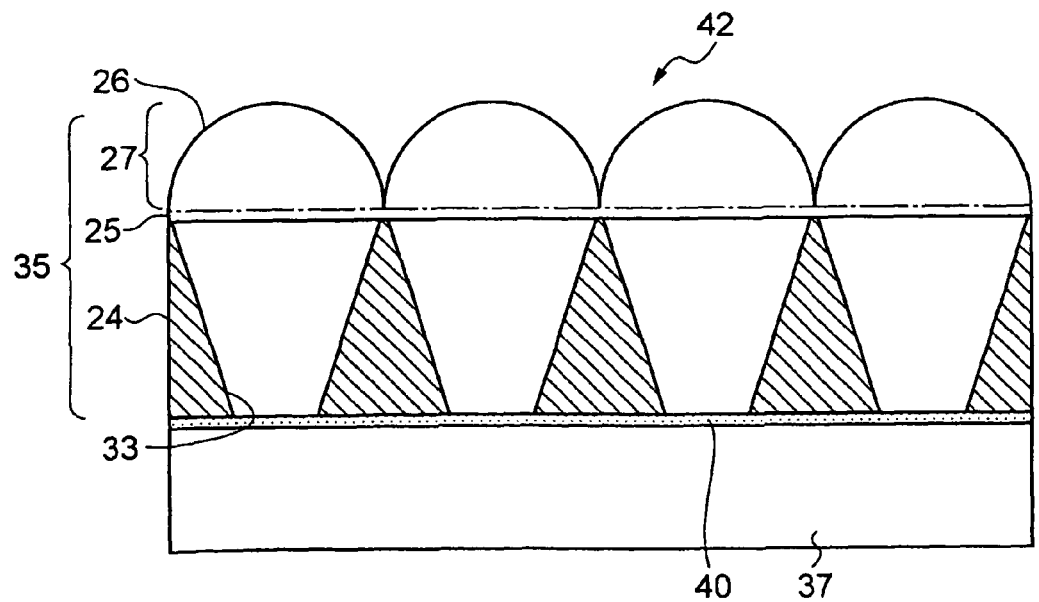

Illustrated in FIG. 21B is a microlens sheet 42 as a second modification to the second embodiment. A transparent reinforcing base 37 having a thickness of, for example, 2 mm is boned to the light-shielding base 24 of the microlens sheet 35 (the second embodiment) via a transparent double-sided adhesive sheet 40. The microlens sheet 42 having the thick reinforcing base 37 exhibits higher mechanical strength than the microlens sheet 35.

Throughout FIGS. 20A to 21B, the self-aligned apertures 13 and 33 may be or may not be completely filled with the transparent resin ink 36 or completely covered by the transparent double-sided adhesive sheet 40. In other words, each modification exhibits almost the same light transmission factor in both cases with and without complete filling or covering.

The transparent reinforcing base 37 may include a diffusing material for a wider angle of field when the modifications are used as a screen. Suitable materials for the transparent reinforcing base 37 are PMMA (polymethyl methacrylate), a copolymer of PMMA and styrene at a ratio of 6:4, etc.

The first and second embodiments employ a closest-packed microlens structure. Not only that, the present invention achieves advantages similar to these embodiments when microlenses are arranged with a given space. Moreover, the present invention achieves similar advantages when microlenses are arranged regularly or irregularly.

As disclosed in detail, the microlens array sheet according to the present invention is provided with a plurality of apertures on the light-shielding base or layer, each aperture having a (reverse) conical trapezoid-like shape in which the size of each aperture on the microlens array side is larger than that on the opposite side, thus exhibiting high light transmissivity to offer high contrast images.

What is claimed is:

1. A method of producing a microlens array sheet comprising the steps of:
    preparing a light-shielding base having a first surface and a second surface opposite to the first surface;
    attaching a microlens array having a plurality of microlens on the first surface of the light-shielding base so that a focal point of each microlens is located in the vicinity of the second surface of the light-shielding base, thus producing a microlens array base structure;
    emitting a laser beam to the microlens array base structure so that the beam is focused onto the focal point of each microlens in a direction orthogonal to the light-shielding base, thus removing a part of the light-shielding base to form an aperture that correspond to each microlens, the aperture having a conical trapezoid-like shape in which a size of the aperture on the first surface side is larger than another size of the aperture on the second surface side;
    providing a transparent double-sided adhesive sheet on the second surface of the light-shielding base; and
    attaching a transparent reinforcing base to the second surface via the adhesive sheet, thus bonding the transparent reinforcing base to the microlens array base structure.

2. The method according to claim 1 further comprising the steps of:
    injecting a transparent resin in the aperture; and
    curing the transparent resin to bond the transparent reinforcing base to the microlens array base structure.

3. The method according to claim 1 further comprising the step of adjusting a total thickness of the microlens array base structure at almost three times a radius of each microlens.

* * * * *